US010794752B2

(12) United States Patent
Deak et al.

(10) Patent No.: US 10,794,752 B2
(45) Date of Patent: Oct. 6, 2020

(54) DIRECT-READ METER CAPABLE OF ELIMINATING MAGNETIC INTERFERENCE OF ADJACENT ROTATING WHEELS

(71) Applicant: MultiDimension Technology Co., Ltd., Zhangjiagang (CN)

(72) Inventors: James Geza Deak, Zhangjiagang (CN); Zhimin Zhou, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 537 days.

(21) Appl. No.: 15/543,356

(22) PCT Filed: Jan. 11, 2016

(86) PCT No.: PCT/CN2016/070543
§ 371 (c)(1),
(2) Date: Nov. 27, 2017

(87) PCT Pub. No.: WO2016/112829
PCT Pub. Date: Jul. 21, 2016

(65) Prior Publication Data
US 2018/0073910 A1 Mar. 15, 2018

(30) Foreign Application Priority Data
Jan. 14, 2015 (CN) .................... 2015 2 0024560 U

(51) Int. Cl.
*G01F 25/00* (2006.01)
*G01F 15/00* (2006.01)
(Continued)

(52) U.S. Cl.
CPC .......... *G01F 25/0007* (2013.01); *G01F 1/586* (2013.01); *G01F 1/60* (2013.01); *G01F 15/00* (2013.01); *G01F 15/066* (2013.01)

(58) Field of Classification Search
CPC ........ G01F 25/0007; G01F 15/00; G01F 1/05; G01F 1/075; G01F 1/0755; G01F 1/08;
(Continued)

(56) References Cited

U.S. PATENT DOCUMENTS 8,051,723 B2 11/2011 Hendey, Sr. et al.
2003/0222642 A1* 12/2003 Butzmann .............. G01D 5/147
324/207.21
(Continued)

FOREIGN PATENT DOCUMENTS

CN 102359804 2/2012
CN 203116756 8/2013
(Continued)

OTHER PUBLICATIONS

"International Application No. PCT/CN2016/070543, International Search Report and Written Opinion dated Mar. 31, 2016", (dated Mar. 31, 2016), 10 pgs.

*Primary Examiner* — Robert R Raevis
(74) *Attorney, Agent, or Firm* — Schwegman Lundberg & Woessner, P.A.

(57) ABSTRACT

A direct-read meter capable of eliminating magnetic interference of adjacent rotating wheels, comprising N coaxial rotating wheel permanent magnets and corresponding magnetic angle sensors, a sampling element, a storage element, and a computation element. The magnetic angle sensors sense a linear superposition of the magnetic field from the intended permanent magnet rotating wheel and the interfering magnetic fields from the other rotating wheel permanent magnets. The sampling element samples the output signals of the N magnetic angle sensors to form a N*1 raw signal matrix $[V/V_p]_k(i)_{raw}$. The storage element stores an N*N correction matrix $[C_{ij}]$; and the computation element computes the correction signal matrix $[V/V_p]_k\text{corr}(i) = [V/V_p]_k(i)_{raw} - \text{sum}\{C(i,j)*[V/V_p]k(j)_{raw}\}$, thus eliminating
(Continued)

the interfering magnetic field and permitting calculation of the rotation angle of the rotating wheel permanent magnets. This direct-read meter has the advantages of simple calculation, high precision, and elimination of the need for magnetic shielding.

20 Claims, 12 Drawing Sheets

(51) Int. Cl.
    *G01F 15/06*     (2006.01)
    *G01F 1/58*     (2006.01)
    *G01F 1/60*     (2006.01)

(58) Field of Classification Search
    CPC .......... G01F 1/115; G01F 1/1155; G01F 1/12; G01F 1/125; G01F 1/80; G01F 1/586; G01F 1/60; G01F 15/066; G01F 15/065

USPC ........ 702/94, 100; 73/1.27, 1.28, 1.34, 1.37, 73/1.41, 1.79, 861.79–861.84, 514.39; 324/202, 207.25, 173, 174
See application file for complete search history.

(56) References Cited

U.S. PATENT DOCUMENTS

| | | |
|---|---|---|
| 2011/0140918 A1 | 6/2011 | Jain et al. |
| 2016/0069723 A1* | 3/2016 | Cheng ..................... G01D 5/14 324/207.21 |

FOREIGN PATENT DOCUMENTS

| | | |
|---|---|---|
| CN | 103968860 | 8/2014 |
| CN | 104568041 | 4/2015 |
| CN | 204421990 | 6/2015 |
| WO | WO-2016112829 | 7/2016 |

* cited by examiner

|    | M1       | M2       | M3       | M4       | M5       |
|----|----------|----------|----------|----------|----------|
| S1 | 0        | -1       | -0.064   | -0.01563 | -0.00601 |
| S2 | -0.125   | 0        | -1       | -0.064   | -0.01563 |
| S3 | -0.02332 | -0.125   | 0        | -1       | -0.064   |
| S4 | -0.008   | -0.02332 | -0.125   | 0        | -1       |
| S5 | -0.00364 | -0.008   | -0.02332 | -0.125   | 0        |

FIG. 5

| Actual rotation angles of rotating wheels ||||| 
|---|---|---|---|---|
| 1 | 2 | 3 | 4 | 5 |
| 0 | 0 | 0 | 0 | 0 |
| 0 | 0 | 0 | 0 | 36 |
| 0 | 0 | 0 | 0 | 72 |
| 0 | 0 | 0 | 0 | 108 |
| 0 | 0 | 0 | 0 | 144 |
| 0 | 0 | 0 | 0 | 180 |
| 0 | 0 | 0 | 36 | 216 |
| 0 | 0 | 0 | 36 | 252 |
| 0 | 0 | 0 | 36 | 288 |
| 0 | 0 | 0 | 36 | 324 |
| 0 | 0 | 0 | 72 | 0 |
| 0 | 0 | 0 | 72 | 36 |
| 0 | 36 | 0 | 108 | 144 |
| 0 | 36 | 0 | 108 | 180 |
| 0 | 36 | 0 | 108 | 216 |
| 0 | 36 | 0 | 108 | 252 |
| 0 | 36 | 0 | 108 | 288 |
| 0 | 36 | 0 | 108 | 324 |
| 0 | 36 | 0 | 144 | 0 |

FIG. 6A

| | | | | |
|---|---|---|---|---|
| 0 | 36 | 0 | 144 | 36 |
| 0 | 36 | 0 | 144 | 72 |
| 0 | 36 | 0 | 144 | 108 |
| 0 | 36 | 0 | 144 | 144 |
| 0 | 36 | 0 | 144 | 180 |
| 0 | 36 | 0 | 144 | 216 |
| 0 | 36 | 0 | 144 | 252 |
| 0 | 36 | 0 | 144 | 288 |
| 0 | 36 | 0 | 144 | 324 |
| 0 | 36 | 0 | 180 | 0 |
| 0 | 36 | 0 | 180 | 36 |
| 0 | 36 | 0 | 180 | 72 |
| 0 | 36 | 0 | 180 | 108 |
| 0 | 36 | 0 | 180 | 144 |
| 0 | 36 | 0 | 180 | 180 |
| 0 | 36 | 0 | 180 | 216 |
| 0 | 36 | 0 | 180 | 252 |
| 0 | 36 | 0 | 180 | 288 |
| 0 | 36 | 0 | 180 | 324 |
| 0 | 36 | 0 | 216 | 0 |
| 0 | 36 | 0 | 216 | 36 |
| 0 | 36 | 0 | 216 | 72 |
| 0 | 36 | 0 | 216 | 108 |
| 0 | 36 | 0 | 216 | 144 |
| 0 | 36 | 0 | 216 | 180 |
| 0 | 36 | 0 | 216 | 216 |
| 0 | 36 | 0 | 216 | 252 |
| 0 | 36 | 0 | 216 | 288 |
| 0 | 36 | 0 | 216 | 324 |
| 0 | 36 | 0 | 252 | 0 |

FIG. 6B

| | | | | |
|---|---|---|---|---|
| 0 | 36 | 0 | 252 | 36 |
| 0 | 36 | 0 | 252 | 72 |
| 0 | 36 | 0 | 252 | 108 |
| 0 | 36 | 0 | 252 | 144 |
| 0 | 36 | 0 | 252 | 180 |
| 0 | 36 | 0 | 252 | 216 |

FIG. 6C

| Raw sensor values | | | | | | | | | |
|---|---|---|---|---|---|---|---|---|---|
| X1 | Y1 | X2 | Y2 | X3 | Y3 | X4 | Y4 | X5 | Y5 |
| -1.00 | 0.00 | -1.00 | 0.00 | -1.00 | 0.00 | -1.00 | 0.00 | -1.00 | 0.00 |
| -1.00 | 0.00 | -1.00 | 0.00 | -1.00 | 0.00 | -1.00 | -0.07 | -0.82 | -0.58 |
| -1.00 | 0.00 | -1.00 | 0.00 | -1.00 | -0.61 | -0.99 | -0.11 | -0.33 | -0.95 |
| -1.00 | 0.00 | -1.00 | 0.00 | -1.00 | -0.61 | -0.99 | -0.12 | 0.29 | -0.96 |
| -1.00 | 0.00 | -1.00 | 0.00 | -1.00 | 0.00 | -1.00 | -0.08 | 0.80 | -0.60 |
| -1.00 | 0.00 | -1.00 | 0.00 | -1.00 | 0.00 | -1.00 | 0.00 | 1.00 | 0.00 |
| -1.00 | 0.00 | -1.00 | 0.00 | -1.00 | -0.66 | -0.82 | -0.58 | 0.81 | 0.59 |
| -1.00 | -0.07 | -1.00 | 0.00 | -1.00 | -0.66 | -0.86 | -0.51 | 0.30 | 0.96 |
| -1.00 | -0.07 | -1.00 | 0.00 | -1.00 | -0.66 | -0.88 | -0.48 | -0.33 | 0.94 |
| -1.00 | -0.07 | -1.00 | 0.00 | -1.00 | -0.66 | -0.89 | -0.48 | -0.82 | 0.57 |
| -1.00 | -0.07 | -1.00 | -0.01 | -0.99 | -0.11 | -0.43 | -0.90 | -1.00 | -0.01 |
| -1.00 | -0.07 | -1.00 | -0.01 | -0.99 | -0.12 | -0.39 | -0.92 | -0.81 | -0.59 |
| -1.00 | -0.07 | -0.85 | -0.53 | -0.99 | -0.14 | 0.36 | -0.93 | 0.80 | -0.60 |
| -1.00 | -0.07 | -0.85 | -0.53 | -0.99 | -0.13 | 0.40 | -0.92 | 1.00 | -0.02 |
| -1.00 | -0.07 | -0.85 | -0.53 | -0.99 | -0.13 | 0.41 | -0.91 | 0.82 | 0.58 |
| -1.00 | -0.07 | -0.85 | -0.53 | -0.99 | -0.12 | 0.37 | -0.93 | 0.31 | 0.95 |
| -1.00 | -0.07 | -0.85 | -0.53 | -0.99 | -0.12 | 0.29 | -0.96 | -0.31 | 0.95 |
| -1.00 | -0.07 | -0.85 | -0.53 | -0.99 | -0.12 | 0.21 | -0.98 | -0.82 | 0.58 |
| -1.00 | -0.07 | -0.85 | -0.53 | -0.99 | -0.69 | 0.75 | -0.66 | -1.00 | -0.01 |
| -1.00 | -0.07 | -0.85 | -0.53 | -1.00 | -0.69 | 0.72 | -0.69 | -0.80 | 0.60 |

| | | | | | | | | |
|---|---|---|---|---|---|---|---|---|
| -1.00 | -0.07 | -0.85 | -0.52 | -0.99 | 0.10 | 0.29 | 0.96 | -0.31 | -0.95 |
| -1.00 | -0.07 | -0.85 | -0.52 | -0.99 | 0.10 | 0.37 | 0.93 | 0.31 | -0.95 |
| -1.00 | -0.06 | -0.85 | -0.52 | -0.99 | 0.11 | 0.41 | 0.91 | 0.82 | -0.58 |
| -1.00 | -0.06 | -0.85 | -0.52 | -0.99 | 0.11 | 0.40 | 0.92 | 1.00 | 0.01 |
| -1.00 | -0.06 | -0.85 | -0.52 | -0.99 | 0.12 | 0.36 | 0.93 | 0.80 | 0.60 |

FIG. 7C

| Raw calculation angles | | | | |
|---|---|---|---|---|
| 1 | 2 | 3 | 4 | 5 |
| 0.0 | 0.0 | 0.0 | 0.0 | 0.0 |
| 0.0 | 0.1 | 0.2 | 3.8 | 35.3 |
| 0.0 | 0.1 | 0.4 | 6.4 | 70.9 |
| 0.0 | 0.1 | 0.4 | 6.9 | 106.9 |
| 0.0 | 0.1 | 0.2 | 4.6 | 143.3 |
| 0.0 | 0.0 | 0.0 | 0.0 | 180 |
| 0.0 | 0.2 | 3.5 | 35.3 | 216.2 |
| 0.0 | 0.1 | 3.4 | 30.7 | 252.6 |
| 0.0 | 0.1 | 3.4 | 28.4 | 289.1 |
| 0.0 | 0.2 | 3.5 | 29.0 | 325.0 |
| 0.1 | 0.4 | 6.4 | 64.3 | 0.8 |
| 0.1 | 0.4 | 6.6 | 67.2 | 36.4 |
| 3.9 | 32.2 | 7.8 | 110.9 | 143.3 |
| 3.9 | 32.2 | 7.5 | 113.5 | 179.1 |
| 3.9 | 32.1 | 7.2 | 114.0 | 215.3 |
| 3.9 | 32.1 | 7.0 | 111.5 | 251.7 |
| 3.9 | 32.1 | 7.0 | 106.8 | 288.2 |
| 3.9 | 32.1 | 7.2 | 102.3 | 324.7 |
| 3.9 | 32.1 | 5.1 | 138.4 | 0.6 |
| 3.9 | 32.1 | 5.4 | 136.1 | 36.7 |
| 3.9 | 32.2 | 5.6 | 136.7 | 72.6 |

FIG. 8A

| | | | | |
|---|---|---|---|---|
| 3.9 | 32.2 | 5.7 | 139.5 | 108.3 |
| 3.9 | 32.3 | 5.4 | 143.4 | 143.8 |
| 3.9 | 32.2 | 5.2 | 147.2 | 179.4 |
| 3.8 | 32.1 | 4.9 | 149.9 | 215.3 |
| 3.8 | 32.1 | 4.7 | 150.4 | 251.4 |
| 3.8 | 32.0 | 4.7 | 147.9 | 287.7 |
| 3.8 | 32.0 | 4.8 | 143.2 | 324.2 |
| 3.8 | 31.9 | 0.6 | 179.9 | 0.0 |
| 3.8 | 32.0 | 0.9 | 176.1 | 36.4 |
| 3.8 | 32.0 | 1.1 | 173.7 | 72.6 |
| 3.8 | 32.1 | 1.1 | 173.7 | 72.6 |
| 3.8 | 32.1 | 0.9 | 176.0 | 144.4 |
| 3.8 | 32.0 | 0.6 | 179.9 | 180.0 |
| 3.8 | 32.0 | 0.3 | 183.8 | 215.6 |
| 3.8 | 31.9 | 0.1 | 186.6 | 251.4 |
| 3.8 | 31.9 | 0.1 | 187.1 | 287.4 |
| 3.8 | 31.9 | 0.1 | 184.7 | 323.6 |
| 3.7 | 31.7 | 356.0 | 221.4 | 339.5 |
| 3.8 | 31.7 | 356.3 | 216.7 | 35.9 |
| 3.8 | 31.8 | 356.5 | 213.9 | 72.3 |
| 3.8 | 31.8 | 356.4 | 209.4 | 108.6 |
| 3.8 | 31.8 | 356.2 | 209.9 | 144.7 |
| 3.7 | 31.8 | 355.9 | 212.6 | 180.3 |
| 3.7 | 31.7 | 355.7 | 216.5 | 216.1 |
| 3.7 | 31.7 | 355.8 | 220.4 | 251.7 |
| 3.7 | 31.6 | 355.5 | 223.2 | 287.4 |
| 3.7 | 31.6 | 355.7 | 223.8 | 323.3 |
| 3.7 | 31.4 | 353.6 | 260.1 | 339.2 |
| 3.7 | 31.6 | 353.9 | 257.8 | 35.4 |
| 3.7 | 31.6 | 354.0 | 253.2 | 71.8 |

FIG. 8B

| | | | | |
|---|---|---|---|---|
| 3.7 | 31.6 | 354.0 | 248.4 | 108.3 |
| 3.7 | 31.6 | 353.8 | 248.9 | 144.7 |
| 3.7 | 31.5 | 353.5 | 246.4 | 180.3 |
| 3.7 | 31.5 | 353.3 | 249.1 | 216.6 |

FIG. 8C

| Corrected sensor output signals | | | | | | | | | |
|---|---|---|---|---|---|---|---|---|---|
| BX1 | BY1 | BX2 | BY2 | BX3 | BY3 | BX4 | BY4 | BX5 | BY5 |
| -2.09 | 0.00 | -2.20 | 0.00 | -2.21 | 0.00 | -2.16 | 0.00 | -1.16 | 0.00 |
| -2.08 | -0.01 | -1.10 | -0.02 | -2.20 | -0.11 | -1.97 | -0.84 | -0.98 | -0.59 |
| -2.08 | -0.01 | -1.20 | -0.03 | -2.16 | -0.18 | -1.48 | -1.86 | -0.49 | -0.96 |
| -2.08 | -0.01 | -1.09 | -0.03 | -2.12 | -0.19 | -0.86 | -1.88 | 0.13 | -0.97 |
| -2.07 | -0.01 | -1.05 | -0.02 | -2.09 | -0.12 | -0.35 | -0.68 | 0.64 | -0.61 |
| -2.07 | 0.00 | -1.05 | 0.00 | -2.08 | 0.00 | -0.16 | 0.00 | 0.84 | 0.00 |
| -2.07 | -0.01 | -3.04 | -0.09 | -1.91 | -0.60 | -0.17 | 0.00 | 0.67 | 0.50 |
| -2.08 | -0.01 | -3.05 | -0.08 | -1.99 | -0.51 | -0.72 | 0.44 | 0.15 | 0.89 |
| -2.08 | -0.01 | -3.06 | -0.08 | -2.05 | -0.47 | -1.36 | 0.46 | -0.47 | 0.88 |
| -2.08 | -0.01 | -3.07 | -0.09 | -2.07 | -0.51 | -1.85 | 0.08 | -0.96 | 0.51 |
| -2.08 | -0.03 | -3.04 | -0.18 | -1.64 | -1.02 | -1.59 | -0.93 | -1.09 | -0.13 |
| -2.07 | -0.04 | -3.03 | -0.19 | -1.58 | -1.08 | -1.35 | -1.53 | -0.89 | -0.71 |
| -1.90 | -0.63 | -2.65 | -0.73 | -0.73 | -1.18 | 1.01 | -1.56 | 0.81 | -0.72 |
| -1.90 | -0.62 | -2.65 | -0.73 | -0.66 | -1.12 | 1.25 | -0.96 | 1.02 | -0.14 |
| -1.90 | -0.62 | -2.65 | -0.73 | -0.66 | -1.07 | 1.07 | -0.37 | 0.83 | 0.46 |
| -1.90 | -0.63 | -2.66 | -0.71 | -0.73 | -1.06 | 0.53 | -0.01 | 0.33 | 0.83 |
| -1.91 | -0.61 | -2.67 | -0.71 | -0.85 | -1.09 | -0.18 | -0.04 | -0.31 | 0.82 |
| -1.91 | -0.62 | -2.68 | -0.72 | -0.96 | -1.13 | -0.76 | -0.43 | -0.82 | 0.49 |
| -1.90 | -0.61 | -2.65 | -0.67 | -0.44 | -0.82 | -0.40 | -0.70 | -0.94 | -0.10 |
| -1.90 | -0.63 | -2.65 | -0.69 | -0.46 | -0.89 | -0.23 | -1.33 | -0.74 | -0.69 |
| -1.90 | -0.62 | -2.64 | -0.70 | -0.42 | -0.91 | 0.28 | -1.67 | -0.24 | -1.05 |
| -1.89 | -0.62 | -2.63 | -0.70 | -0.34 | -0.88 | 0.92 | -1.62 | 0.38 | -1.04 |
| -1.89 | -0.62 | -2.63 | -0.68 | -0.27 | -0.80 | 1.46 | -1.21 | 0.87 | -0.67 |
| -1.89 | -0.61 | -2.63 | -0.67 | -0.22 | -0.70 | 1.69 | -0.38 | 1.07 | -0.08 |
| -1.89 | -0.61 | -2.62 | -0.65 | -0.23 | -0.62 | 1.53 | 0.05 | 0.89 | 0.51 |
| -1.89 | -0.60 | -2.63 | -0.64 | -0.24 | -0.58 | 1.04 | 0.43 | 0.39 | 0.88 |
| -1.90 | -0.6 | -2.64 | -0.64 | -0.20 | -0.62 | 0.39 | 0.40 | -0.23 | 0.88 |
| -1.90 | -0.61 | -2.65 | -0.65 | -0.38 | -0.71 | -0.16 | -0.04 | -0.74 | 0.50 |
| -1.90 | -0.60 | -2.64 | -0.55 | -0.19 | -0.08 | -0.15 | -0.02 | -0.91 | -0.01 |
| -1.90 | -0.60 | -2.64 | -0.57 | -0.18 | -0.23 | 0.04 | -0.69 | -0.71 | -0.61 |
| -1.90 | -0.61 | -2.63 | -0.58 | -0.16 | -0.27 | 0.54 | -1.10 | -0.23 | -0.98 |
| -1.89 | -0.61 | -2.62 | -0.58 | -0.12 | -0.26 | 1.16 | -1.08 | 0.41 | -0.97 |
| -1.89 | -0.60 | -2.61 | -0.57 | -0.08 | -0.19 | 1.66 | -0.67 | 0.90 | -0.60 |
| -1.89 | -0.60 | -2.61 | -0.55 | -0.07 | -0.08 | 1.85 | -0.02 | 1.09 | -0.01 |

| Corrected rotation angles of magnetic rotating wheels | | | | | Error | |
|---|---|---|---|---|---|---|
| 1 | 2 | 3 | 4 | 5 | Raw | Corrected |
| 0.0 | 0.0 | 0.0 | 0.0 | 0.0 | 0.00 | 0.00 |
| 0.0 | -0.1 | -0.5 | 0.1 | 36.0 | 0.95 | 0.13 |
| 0.0 | -0.1 | -0.8 | 0.0 | 72.0 | 1.60 | 0.20 |
| 0.0 | -0.1 | -0.9 | 0.0 | -72.0 | 1.70 | 0.21 |
| 0.0 | -0.1 | -0.6 | -0.1 | -35.9 | 1.11 | 0.16 |
| 0.0 | 0.0 | 0.0 | 0.0 | 0.0 | 0.00 | 0.00 |
| 0.0 | -0.4 | 0.1 | 36.0 | 36.0 | 0.93 | 0.12 |
| 0.0 | -0.4 | 0.6 | 36.0 | 71.9 | 1.92 | 0.21 |
| 0.0 | -0.4 | 0.6 | 36.0 | -72.0 | 2.44 | 0.25 |
| 0.0 | -0.4 | 0.7 | 35.9 | -36.0 | 2.35 | 0.26 |
| -0.1 | -0.8 | 0.3 | 71.9 | 0.0 | 3.04 | 0.26 |
| -0.1 | -0.8 | 0.2 | 71.9 | 36.0 | 2.46 | 0.25 |

FIG. 10A

| | | | | | | |
|---|---|---|---|---|---|---|
| 0.3 | 35.1 | 0.2 | -71.9 | -36.0 | 3.80 | 0.30 |
| 0.3 | 35.1 | 0.3 | -71.9 | 0.0 | 4.33 | 0.31 |
| 0.3 | 35.2 | 0.3 | -72.0 | 36.0 | 4.34 | 0.30 |
| 0.4 | 35.2 | 0.2 | -72.0 | 72.0 | 3.73 | 0.28 |
| 0.4 | 35.2 | 0.0 | -71.9 | -72.0 | 3.25 | 0.25 |
| 0.3 | 35.2 | -0.2 | -71.9 | -36.1 | 4.31 | 0.30 |
| 0.4 | 35.4 | -0.5 | -35.9 | -0.1 | 3.80 | 0.33 |
| 0.3 | 35.4 | -0.7 | -35.9 | 36.0 | 4.36 | 0.37 |
| 0.5 | 35.3 | -0.7 | -36.0 | 72.0 | 4.22 | 0.33 |
| 0.3 | 35.3 | -0.4 | -36.0 | -71.9 | 3.62 | 0.30 |
| 0.3 | 35.4 | 0.0 | -35.9 | -36.0 | 2.79 | 0.22 |
| 0.4 | 35.4 | 0.4 | -35.9 | 0.0 | 3.33 | 0.39 |
| 0.4 | 35.5 | 0.7 | -35.9 | 36.0 | 3.86 | 0.34 |
| 0.4 | 35.5 | 0.7 | -36.0 | 72.0 | 3.98 | 0.33 |
| 0.4 | 35.5 | 0.4 | -36.0 | -72.0 | 3.34 | 0.29 |
| 0.4 | 35.4 | 0.0 | -35.9 | -36.0 | 2.73 | 0.22 |
| 0.4 | 35.9 | 0.0 | 0.0 | 0.0 | 1.72 | 0.11 |
| 0.4 | 35.8 | -0.6 | 0.0 | 35.9 | 2.80 | 0.25 |
| 0.4 | 35.8 | -0.9 | 0.0 | 72.0 | 3.36 | 0.31 |
| 0.4 | 35.8 | -0.8 | 0.0 | -72.0 | 3.24 | 0.29 |
| 0.4 | 35.8 | -0.5 | 0.0 | -35.9 | 2.68 | 0.22 |
| 0.4 | 35.9 | 0.0 | 0.00 | 0.0 | 1.78 | 0.11 |
| 0.4 | 35.9 | 0.5 | 0.0 | 35.9 | 2.46 | 0.22 |
| 0.4 | 36.0 | 0.9 | 0.0 | 72.0 | 3.02 | 0.27 |
| 0.4 | 36.0 | 0.9 | 0.0 | -72.0 | 3.14 | 0.29 |
| 0.4 | 36.0 | 0.6 | 0.0 | -35.9 | 2.64 | 0.24 |
| 0.5 | 36.4 | 0.6 | 35.9 | 0.1 | 3.59 | 0.33 |
| 0.5 | 36.3 | 0.1 | 35.9 | 36.0 | 2.58 | 0.20 |
| 0.5 | 36.3 | -0.4 | 36.0 | 72.0 | 3.19 | 0.24 |
| 0.5 | 36.2 | -0.6 | 36.0 | -72.0 | 3.74 | 0.28 |

FIG. 10B

| 0.5 | 36.3 | -0.6 | 35.9 | -36.0 | 3.69 | 0.28 |
|-----|------|------|------|-------|------|------|
| 0.5 | 36.3 | -0.3 | 35.9 | 0.0 | 3.17 | 0.25 |
| 0.5 | 36.4 | 0.1 | 35.9 | 36.0 | 2.59 | 0.21 |
| 0.5 | 36.4 | 0.5 | 36.0 | 71.9 | 3.45 | 0.30 |
| 0.5 | 36.4 | 0.7 | 36.0 | -72.0 | 4.07 | 0.36 |
| 0.5 | 36.4 | 0.8 | 35.9 | -36.0 | 4.16 | 0.37 |
| 0.5 | 36.6 | 0.3 | 71.9 | 0.1 | 4.71 | 0.31 |
| 0.5 | 36.6 | 0.2 | 71.9 | 36.1 | 4.16 | 0.31 |
| 0.5 | 36.5 | 0.1 | 71.9 | 72.0 | 3.10 | 0.24 |
| 0.5 | 36.5 | -0.1 | 72.0 | -72.0 | 3.60 | 0.23 |
| 0.5 | 36.5 | -0.2 | 72.0 | -36.0 | 4.21 | 0.26 |
| 0.5 | 36.5 | -0.2 | 71.9 | 0.0 | 4.21 | 0.26 |
| 0.5 | 36.6 | -0.1 | 71.9 | 36.0 | 3.70 | 0.26 |

DIRECT-READ METER CAPABLE OF ELIMINATING MAGNETIC INTERFERENCE OF ADJACENT ROTATING WHEELS

PRIORITY CLAIM TO RELATED APPLICATIONS

This application is a U.S. national stage application filed under 35 U.S.C. § 371 from International Application Serial No. PCT/CN2016/070543, which was filed 11 Jan. 2016, and published as WO2016/112829 on 21 Jul. 2016, and which claims priority to Chinese Application No. 201520024560.0, filed 14 Jan. 2015, and to Chinese Application No. 201510029996.3, filed 21 Jan. 2015, which applications and publication are incorporated by reference as if reproduced herein and made a part hereof in their entirety, and the benefit of priority of each of which is claimed herein.

TECHNICAL FIELD

The present invention relates to the field of magnetic sensors, and in particular, to a direct-read meter capable of eliminating magnetic interference of adjacent rotating wheels.

BACKGROUND ART

A direct-read electronic flow meter includes multiple coaxial rotating wheels. There is a set transmission ratio relationship between the rotating wheels. The total number of turns of the electronic flow meter can be calculated through detection, on the angular positions of the rotating wheels and the transmission ratio relationship therebetween. Measurement of the positions of the coaxial rotating wheels can be realized by employing a combination of magnetic angle sensors and permanent magnet rotating wheels. In a system composed of a single permanent magnet rotating wheel and a single magnetic angle sensor, the magnetic angle sensor can precisely measure a rotation position and a rotation angle of the permanent magnet rotating wheel. However, a direct-read water meter of a system including multiple permanent magnet rotating wheels has the following problems:

As the distance between the permanent magnet rotating wheels cannot be too far, a magnetic sensor, in addition to detecting the magnetic field from the corresponding permanent magnet rotating wheel, are also subject to interfering magnetic fields from other permanent magnet rotating wheels. In this case, magnetic field angles calculated according to two output voltages of the magnetic angle sensors are no longer linear with rotation angles of the permanent magnet rotating wheels.

A solution is generally introducing soft magnetic materials between the permanent magnet rotating wheels to implement magnetic shielding. In this way, on one hand, the manufacturing cost of the read-only type water meter is increased, and on the other hand, a magnetic circuit of the system may be changed, which increases complexity of distribution of the magnetic fields and introduces non-linear components.

SUMMARY OF THE INVENTION

In order to solve the problem of mutual interference between the permanent magnet rotating wheels, the present invention proposes a direct-read meter capable of eliminating magnetic interference of adjacent rotating wheels, which converts a raw magnetic field measured by a magnetic sensor to a correction magnetic field through an algorithm without relying on increasing magnetic shielding, and implements exclusion of interfering magnetic fields according to output signals thereof, thus obtaining precise information of rotation angles.

The present invention proposes a direct-read meter capable of eliminating magnetic interference of adjacent rotating wheels, the direct-read meter including N permanent magnet rotating wheels and N corresponding biaxial magnetic angle sensors, the $i^{th}$ magnetic angle sensor sensing, along an X axis and a Y axis perpendicular to each other, a linear superposition of an intended magnetic field produced by the $i^{th}$ permanent magnet rotating wheel and interfering magnetic fields produced by the other N−1 permanent magnet rotating wheels, the permanent magnet rotating wheel producing the interfering magnetic field being the $j^{th}$ permanent magnet rotating wheel, and $j \neq i$, wherein the direct-read meter includes:

a sampling element capable of high-speed sampling all the raw output sine/cosine signals of the N biaxial magnetic angle sensors to form a N*1 raw signal matrix $[V/V_p]_k(i)_{raw}$, a storage element capable of storing an N*N correction matrix $[C_{ij}]$, and a computation element that performs arithmetical operation $[V/V_p]_k\text{corr}(i) = [V/V_p]_k(i)_{raw} - \text{sum}\{C(i, j) * [V/V_p]_k(j)_{raw}\}$ to eliminate the interfering magnetic field and obtain a rotation angle of the permanent magnet rotating wheel, wherein k=x or y, the element in the raw signal matrix $[V/V_p]_k(i)_{raw}$ is $V_{xi}/V_{pxi}$ or $V_{yi}/V_{pyi}$, $V_{xi}$ and $V_{yi}$ respectively correspond to two axial output raw signals of the $i^{th}$ biaxial magnetic angle sensor along the X axis and the Y axis, $V_{pxi}$ and $V_{pyi}$ respectively correspond to peak values of the two axial output raw signals of the $i^{th}$ biaxial magnetic angle sensor along the X axis and the Y axis, and $[V/V_p]_k(i)_{raw}$ and $[V/V_p]_k\text{corr}(i)$ are respectively the N*1 raw signal matrix and the correction signal matrix of the biaxial magnetic angle sensor.

The raw signals $V_{xi}$, $V_{pxi}$ and $V_{yi}$, $V_{pyi}$ are respectively numerical values of two output sine/cosine signal curves of the biaxial magnetic angle sensor after offset processing.

The correction matrix $[C_{ij}]$ is obtained by finite element calculation, or obtained by direct measurement data calculation.

Correction coefficients of the correction matrix $[C_{ij}]$ depend on geometrical parameters of the permanent magnet rotating wheels, relative positions of the permanent magnet rotating wheels and the biaxial magnetic angle sensors, and magnetization states, for example, magnetization directions and magnetization intensities of the permanent magnet rotating wheels; when the geometrical parameters and magnetization states of the permanent magnet rotating wheels are the same, the correction coefficients of the correction matrix $[C_{ij}]$ are the same.

In the water meter, there is no soft magnetic shielding material between the permanent magnet rotating wheels.

The permanent magnet rotating wheels are cylindrical, magnetization directions of the permanent magnet rotating wheels either are parallel to directions of the permanent magnet rotating wheels passing through the diameter, or are along directions perpendicular to upper and lower bottom surfaces of the permanent magnet rotating wheels, and there are anti-parallel magnetization directions in two half cylinders.

The biaxial magnetic angle sensors are X-Y biaxial angle sensors.

The biaxial magnetic angle sensors are AMR, GMR or TMR magnetic angle sensors.

Components output by non-linear voltage signals acting upon the biaxial magnetic angle sensors are reduced to improve precision of the measurement after correction.

When the biaxial magnetic angle sensors are GMR or TMR spin-valve sensors, magnetic field intensities of the permanent magnet rotating wheels are reduced, thus reducing rotation magnitude of pinning layers of the biaxial magnetic angle sensors, to reduce non-linear components of curves of magnetic field measurement angles of the biaxial magnetic angle sensors vs. magnetic field rotation angles, thus reducing non-linear components of the raw sine/cosine output voltage signals and improving precision after correction.

The magnetic design of the permanent magnet rotating wheels is improved to maintain constant magnitude of rotating magnetic fields at positions of the biaxial magnetic angle sensors, thus reducing the non-linear components of the raw sine/cosine output voltage signals and improving precision after correction.

The intended magnetic field is higher than the interfering magnetic fields to improve the precision after correction.

The biaxial magnetic angle sensors are close to rotating shafts of the permanent magnet rotating wheels to improve the precision after correction.

A method for eliminating magnetic interference of adjacent rotating wheels in a direct-read water meter, the direct-read water meter including N permanent magnet rotating wheels and N corresponding biaxial magnetic angle sensors, a magnetic field sensed by the $i^{th}$ magnetic angle sensor being a superposition of an intended magnetic field thereof, i.e., a magnetic field of the $i^{th}$ permanent magnet rotating wheel to be detected and interfering magnetic fields, i.e., magnetic fields of other N−1 $j^{th}$ (j≠i) permanent magnet rotating wheels, raw output sine/cosine signals of the N biaxial magnetic angle sensors forming a N*1 raw signal matrix $[V_i/V_{pi}]_{raw}$, and $V_{xi}$, $V_{pxi}$ and $V_{yi}$, $V_{pyi}$ respectively corresponding to two axial raw output signals of the biaxial magnetic angle sensors along an X axis and a Y axis and peak values thereof, wherein a N*1 signal correction matrix $[V_i/V_{pi}]_{correct}$ formed by correction signals of the N biaxial magnetic angle sensors can be obtained by multiplying the N*1 raw output sine/cosine signal matrix $[V_i/V_{pi}]_{raw}$ by an N*N correction matrix $[C_{ij}]$, that is:

after conversion of the correction matrix $[C_{ij}]$, signals produced by the intended magnetic field after elimination of the interfering magnetic fields are obtained according to the correction signal matrix $[V_{ix}/V_{xpi}]_{correct}$ and $[V_{iy}/V_{ypi}]_{correct}$, and actual rotation angles of the permanent magnet rotating wheels are calculated directly.

BRIEF DESCRIPTION OF THE DRAWINGS

FIG. 5 is Table 1 of a correction factor matrix of a system including 5 permanent magnet rotating wheels and 5 magnetic angle sensors;

FIG. 6 is Table 2 of rotation angles of magnet rotating wheels of a system including 5 permanent magnet rotating wheels and 5 magnetic angle sensors:

FIG. 7 is Table 3 of raw output signals of a system including 5 permanent magnet rotating wheels and 5 magnetic angle sensors;

FIG. 8 is Table 4 of calculation values of raw rotation angles of a system including 5 permanent magnet rotating wheels and 5 magnetic angle sensors;

FIG. 9 is Table 5 of corrected output signals of a system including 5 permanent magnet rotating wheels and 5 magnetic angle sensors;

FIG. 10 is Table 6 of corrected rotation angles and errors of magnet rotating wheels of a system including 5 permanent magnet rotating wheels and 5 magnetic angle sensors;

DETAILED DESCRIPTION

The present invention is described below in detail with reference to the accompanying drawings and in combination with embodiments.

Embodiment I

Figure 1:
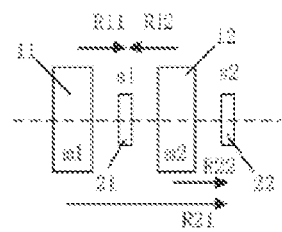
FIG. 1 is a schematic diagram of a direct-read meter system of two permanent magnet rotating wheels and two magnetic angle sensors.
Figure 2:
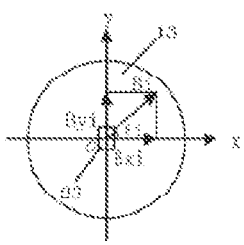
FIG. 2 is a diagram of relative positions and rotating magnetic fields of permanent magnet rotating wheels and magnetic angle sensors.
Figure 3:
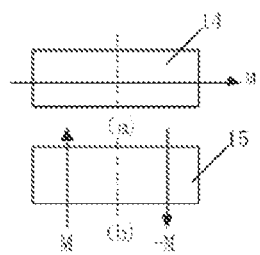
FIG. 3 is a diagram of magnetization states of permanent magnet rotating wheels; a) magnetization parallel to directions passing through the diameter; and b) magnetization perpendicular to bottom surfaces.

FIG. 1 is the simplest situation that the system is a direct-read meter including two permanent magnet rotating wheels m1 (i.e., 11) and m2 (i.e., 12) and corresponding magnetic angle sensors s1 (i.e., 21) and s2 (i.e., 22). A position relationship between one permanent magnet rotating wheel 13 and a magnetic angle sensor 23 and a relationship of magnetic fields produced by the permanent magnet rotating wheel 13 at the magnetic angle sensor 23 are as shown in FIG. 2, wherein Bi is a rotating magnetic field and can be decomposed into X and Y magnetic field components $B_{xi}$ and $B_{yi}$ that are perpendicular to each other. In the figure, the magnetic angle sensor 23 is near a center shaft of the permanent magnet rotating wheel 13. As a matter of fact, the magnetic angle sensor 23 may also be located in another operating area deviating from the axis. FIG. 3 shows two magnetization states of the permanent magnet rotating wheel, one of which is as shown in FIG. 3(a), i.e., the permanent magnet rotating wheel 14 has a magnetization direction parallel to a diameter direction of a bottom surface thereof, and the other one of which is as shown in FIG. 3(b), i.e., there are magnetization directions perpendicular to directions of upper and lower bottom surfaces in two half cylinders of 180 degrees of the permanent magnet rotating wheel 15 respectively, and the two half cylinders have anti-parallel magnetization directions.

An X-direction magnetic field component $B_{x1}$ sensed by the S1 magnetic angle sensor 21 may be represented as a linear superposition of an X magnetic field component $B_{x11}$ produced herein by the permanent magnet rotating wheel m1 (i.e., 11) and a magnetic field component $B_{x21}$ produced herein by the permanent magnet rotating wheel m2 (i.e., 12). Similarly an X-direction magnetic field component $B_{x2}$ sensed by the S2 magnetic angle sensor 22 may be represented as a linear superposition of an X-direction magnetic field component $B_{x12}$ produced herein by the permanent magnet rotating wheel m1 (i.e., 11) and $B_{122}$ produced herein by the permanent magnet rotating wheel m2 (i.e., 12).

$$B_{x1} = B_{x11} + B_{x21}, \tag{1}$$

$$B_{x2} = B_{x12} + B_{x22} \tag{2}$$

Further, it is assumed that the magnetic field magnitude of the permanent magnet rotating wheel m1 at the magnetic angle sensor s1 is C(R11), and an angle between it and the X axis is $\theta_1$, and at the same time, it is assumed that the magnetic field magnitude of the permanent magnet rotating wheel m1 at the magnetic angle sensor s2 is C(R12), and an angle between it and the X axis is also $\theta_1$. Similarly, it is assumed that magnetic fields of the permanent magnet rotating wheel m2 at the magnetic angle sensors s1 and s2 are respectively C(R21) and C(R22), and angles between them and the X axis are both $\theta_2$:

$$C(R11) = \frac{\mu_0 MV}{4\pi R_{11}^3} \tag{3}$$

$$C(R12) = \frac{\mu_0 MV}{4\pi R_{12}^3} \tag{4}$$

$$C(R21) = \frac{\mu_0 MV}{4\pi R_{21}^3} \tag{5}$$

$$C(R22) = \frac{\mu_0 MV}{4\pi R_{22}^3} \tag{6}$$

Then, the magnetic field component $B_{x1}$ of the magnetic angle sensor s1 in the X direction and the magnetic field component $B_{x2}$ of the magnetic angle sensor s2 in the X direction are respectively:

$$B_{x1} = C(R_{11})\cos(\theta_1) + C(R_{21})\cos(\theta_2) \tag{7}$$

$$B_{x2} = C(R_{12})\cos(\theta_1) + C(R_{22})\cos(\theta_2) \tag{8}$$

During measurement, the angles $\theta_1$ and $\theta_2$ are respectively a value after regularization of a voltage signal $V_{xi}$ output by the x-axis sensor in the magnetic angle sensors m1 and m2 relative to the peak value $V_{xpi}$ and a value after regularization of a voltage signal $V_{yi}$ output by the Y-axis sensor relative to the peak value $V_{ypi}$. As $V_{xi}$ is a cosine curve:

$$V_{xi} = V_{xpi} \cos \theta_i \tag{9}$$

Thus $$\cos\theta_i = \frac{V_{xi}}{V_{xpi}},$$

and $V_{xi}/V_{pxi}$ output by the magnetic angle sensor corresponding to an axial output raw signal of the $i^{th}$ biaxial magnetic angle sensor along the X axis is a cosine curve.

Similarly, for the y-axis components, there is also a similar relationship. The magnetic field component $B_{y1}$ of the magnetic angle sensor s1 in the Y direction and the magnetic field component $B_{y2}$ of the magnetic angle sensor s2 in the Y direction are respectively:

$$B_{y1} = B_{y11} + B_{y21} \tag{10}$$

$$B_{y2} = B_{y12} + B_{y22} \tag{11}$$

$$B_{y1} = C(R_{11})\sin(\theta_1) + C(R_{21})\sin(\theta_2) \tag{12}$$

$$B_{y2} = C(R_{12})\sin(\theta_1) + C(R_{22})\sin(\theta_2) \tag{13}$$

$V_{yi}$ is a sine curve:

$$V_{yi} = V_{ypi} \sin \theta_i \tag{14}$$

Thus $$\sin\theta_i = \frac{V_{yi}}{V_{ypi}},$$

and $V_{yi}/V_{pyi}$ output by the magnetic angle sensor corresponding to an axial output raw signal of the $i^{th}$ biaxial magnetic angle sensor along the Y axis is a sine curve.

Figure 4:
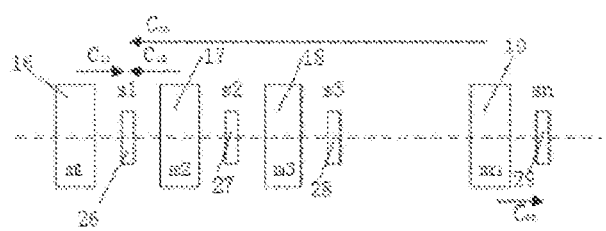
FIG. 4 is a schematic diagram of a direct-read meter system of multiple permanent magnet rotating wheels and multiple magnetic angle sensors.

The direct-read meter system including two permanent magnet rotating wheels and two magnetic angle sensors are expanded to include n permanent magnet rotating wheels 16, 17 and 19 and multiple magnetic angle sensors 26, 27 and 29 as shown in FIG. 4, and then X and Y-direction magnetic field components sensed by each magnetic angle sensor are respectively:

$$B_{xj} = \sum_i C_{ij}\cos(\theta_i) = \sum_i C_{ij}\frac{V_{xi}}{V_{xpi}} \tag{15}$$

$$B_{yi} = \sum_i C_{ij}\sin(\theta_i) = \sum_i C_{ij}\frac{V_{yi}}{V_{ypi}} \tag{16}$$

$$C_{ij} = \frac{\mu_0 MV}{4\pi r_{ij}^3} \tag{17}$$

Then, for a read-only type water meter including N permanent magnet rotating wheels and N magnetic angle sensors, X and Y magnetic field components are represented as a form of matrix:

$$\begin{pmatrix} B_{x1} \\ B_{x2} \\ \circ \\ \circ \\ B_{xn} \end{pmatrix} = \begin{Bmatrix} C_{11} & C_{21} & \circ & \circ & C_{n1} \\ C_{12} & C_{22} & \circ & \circ & C_{n2} \\ \circ & \circ & \circ & \circ & \circ \\ \circ & \circ & \circ & \circ & \circ \\ C_{1n} & \circ & \circ & \circ & C_{nm} \end{Bmatrix} \begin{pmatrix} \cos\theta_1 \\ \cos\theta_2 \\ \circ \\ \circ \\ \cos\theta_n \end{pmatrix} \tag{18}$$

$$\begin{pmatrix} B_{y1} \\ B_{y2} \\ \circ \\ \circ \\ B_{yn} \end{pmatrix} = \begin{Bmatrix} C_{11} & C_{21} & \circ & \circ & C_{n1} \\ C_{12} & C_{22} & \circ & \circ & C_{n2} \\ \circ & \circ & \circ & \circ & \circ \\ \circ & \circ & \circ & \circ & \circ \\ C_{1n} & \circ & \circ & \circ & C_{nm} \end{Bmatrix} \begin{pmatrix} \sin\theta_1 \\ \sin\theta_2 \\ \circ \\ \circ \\ \sin\theta_n \end{pmatrix} \tag{19}$$

Positive diagonal terms correspond to intended terms, and non-positive diagonal terms correspond to interfering terms. That is, as for the $i^{th}$ magnetic angle sensor, the magnetic field produced by the $i^{th}$ permanent magnet rotating wheel corresponding thereto is an intended magnetic field, while other N−1 permanent magnet rotating wheels produce interfering magnetic fields. The permanent magnet rotating wheels producing the interfering magnetic fields are the $j^{th}$ permanent magnet rotating wheel, wherein j≠i. What sensed by the $i^{th}$ magnetic angle sensor along an X axis and a Y axis perpendicular to each other is a linear superposition of the intended magnetic field produced by the $i^{th}$ permanent magnet rotating wheel and the interfering magnetic fields produced by the other N−1 permanent magnet rotating wheels. It can be seen that a coefficient matrix is common for X and Y magnetic fields, that is $$|C| = \begin{Bmatrix} C_{11} & C_{21} & \circ & \circ & C_{n1} \\ C_{12} & C_{22} & \circ & \circ & C_{n2} \\ \circ & \circ & \circ & \circ & \circ \\ \circ & \circ & \circ & \circ & \circ \\ C_{ln} & \circ & \circ & \circ & C_{nm} \end{Bmatrix} \quad (20)$$

The coefficient matrix of the interfering terms is:

$$|C_{int}| = \begin{Bmatrix} 0 & C_{21} & \circ & \circ & C_{n1} \\ C_{12} & 0 & \circ & \circ & C_{n2} \\ \circ & \circ & \circ & \circ & \circ \\ \circ & \circ & \circ & \circ & \circ \\ C_{ln} & \circ & \circ & \circ & 0 \end{Bmatrix} \quad (21)$$

The coefficient matrix corresponding to the intended terms is:

$$|C_d| = \begin{Bmatrix} C_{11} & 0 & \circ & \circ & 0 \\ 0 & C_{22} & \circ & \circ & \circ \\ \circ & \circ & C_{33} & \circ & \circ \\ \circ & \circ & \circ & \circ & \circ \\ 0 & \circ & \circ & \circ & C_{nm} \end{Bmatrix} \quad (22)$$

If the nearest adjacent interfering term is less than the intended term, the magnetic field angle of the sensor is mainly determined by the intended term, and then the intended magnetic field term has the following approximation relation:

$$|B_d| = |V|_{correct} = \{|C_d| - |C_{int}|\}|V|_{raw} \quad (23)$$

where $|B_d|$ is an intended magnetic field, $|V|_{correct}$ is a signal produced by the intended magnetic field in the magnetic angle sensor, and $|V|_{raw}$ is an actual signal (including signals produced by the interfering magnetic fields) produced in the magnetic angle sensor.

Then, it leads to the following approximation result, and the intended magnetic field signal in the X direction and the intended magnetic field signal in the Y direction are respectively:

$$\begin{pmatrix} V_{x1}/V_{xp1} \\ V_{x2}/V_{xp2} \\ \circ \\ \circ \\ V_{xn}/V_{xpn} \end{pmatrix}_{correct} = \begin{Bmatrix} C_{11} & -C_{21} & \circ & \circ & -C_{n1} \\ -C_{12} & C_{22} & \circ & \circ & -C_{n2} \\ \circ & \circ & \circ & \circ & \circ \\ \circ & \circ & \circ & \circ & \circ \\ -C_{ln} & \circ & \circ & \circ & C_{nm} \end{Bmatrix} \begin{pmatrix} V_{x1}/V_{xp1} \\ V_{x2}/V_{xp2} \\ \circ \\ \circ \\ V_{xn}/V_{xpn} \end{pmatrix}_{raw} \quad (24)$$

$$\begin{pmatrix} V_{y1}/V_{yp1} \\ V_{y2}/V_{yp2} \\ \circ \\ \circ \\ V_{yn}/V_{ypn} \end{pmatrix}_{correct} = \begin{Bmatrix} C_{11} & -C_{12} & \circ & \circ & -C_{n1} \\ -C_{12} & C_{22} & \circ & \circ & -C_{n2} \\ \circ & \circ & \circ & \circ & \circ \\ \circ & \circ & \circ & \circ & \circ \\ -C_{ln} & \circ & \circ & \circ & C_{nm} \end{Bmatrix} \begin{pmatrix} V_{y1}/V_{yp1} \\ V_{y2}/V_{yp2} \\ \circ \\ \circ \\ V_{yn}/V_{ypn} \end{pmatrix}_{raw} \quad (25)$$

wherein $$\begin{Bmatrix} C_{11} & -C_{21} & \circ & \circ & -C_{n1} \\ -C_{12} & C_{22} & \circ & \circ & -C_{n2} \\ \circ & \circ & \circ & \circ & \circ \\ \circ & \circ & \circ & \circ & \circ \\ -C_{ln} & \circ & \circ & \circ & C_{nm} \end{Bmatrix}$$

is a correction matrix, then, at this point, rotation angles corresponding to the permanent magnet rotating wheels may be calculated as follows according to the above magnetic fields from which interference is eliminated:

$$\sin \theta_i' = (V_{yi}/V_{ypi})_{correct} / \sqrt{(V_{yi}/V_{ypi})_{correct}^2 + (V_{xi}/V_{xpi})_{correct}^2} \quad (26)$$

$$\cos \theta_i' = (V_{xi}/V_{xpi})_{correct} / \sqrt{(V_{yi}/V_{ypi})_{correct}^2 + (V_{xi}/V_{xpi})_{correct}^2} \quad (27)$$

In a direct-read meter composed of N permanent magnet rotating wheels and N magnetic angle sensors, the permanent magnet rotating wheels and magnetic angle sensors thereof have the following features: the magnetic angle sensors are X-Y biaxial angle sensors, and located at positions parallel to bottom surfaces of the permanent magnet rotating wheels.

As the above correction matrix is based on a linear superposition of magnetic fields of the permanent magnet rotating wheels at magnetic angle positions, its precision relies on reduction of non-linear factors of the system. Firstly, as the magnetic angle sensors are AMR, TMR or GMR magnetoresistive sensors, when the magnetic angle sensors are TMR or GMR spin-valves, reduction of rotation from pinning layers under an external magnetic field helps to reduce non-linearity of the system; therefore, it is required that the magnetic field of the permanent magnet rotating wheel cannot be too strong in the premise of meeting saturation as much as possible. Secondly, it is further required that shielding materials and other soft magnetic materials that interfere with distribution of magnetic fields should not be introduced in the system. Thirdly, if the magnetic angle sensors are in linear operating regions on surfaces of the permanent magnet rotating wheels as much as possible, and if the magnetic angle sensors are close to the position of the rotation axis as much as possible, the linearity thereof can be improved. Improving the magnetic design of the permanent magnet rotating wheels to maintain magnitude of rotating magnetic fields constant is conducive to reducing the non-linear components of the output voltage signals and improving precision after correction.

In addition, $V_{xi}$, $V_{pxi}$ and $V_{yi}$, $V_{pyi}$ are respectively two output sine/cosine signal curves of the magnetic angle sensor, and during output, there is a possibility of deviating from the sine-cosine equation. In this case, the above numerical values can be obtained after offset correction processing.

Besides, it can be seen according to the above analysis that the correction coefficient $C_{ij}$ depends on the permanent magnet rotating wheels, geometrical sizes between the permanent magnet rotating wheels and the permanent magnet rotating wheels relative to the biaxial magnetic angle sensors and magnetization states of the permanent magnet rotating wheels, for example, magnetization directions and magnetization intensities. If the geometrical sizes and the magnetization states of the permanent magnet rotating wheels are the same, the correction coefficients of the correction matrix are the same. The correction coefficients and the matrix thereof can be obtained by finite element calculation, or obtained by direct measurement data calculation.

Embodiment II

Figure 7B:
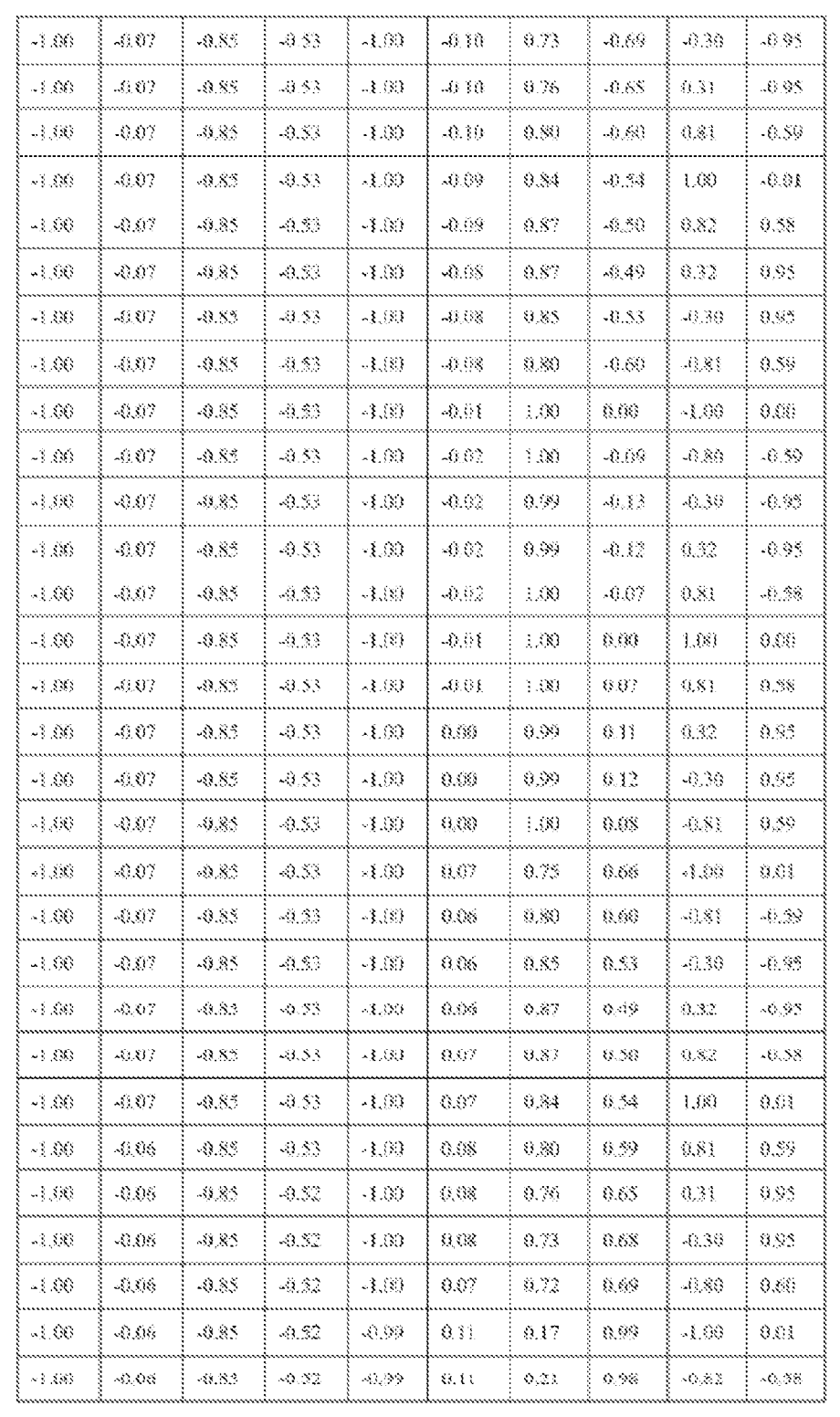
Figures 10C, 11:
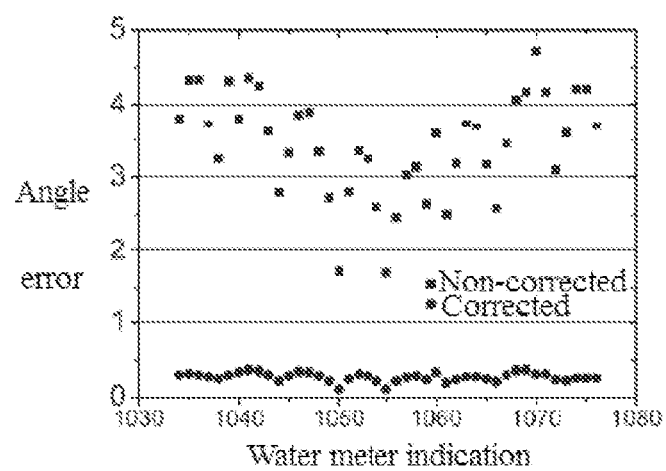
FIG. 11 is a diagram of comparison between angle errors of a water meter after correction and before correction.

The above algorithm of eliminating magnetic interference is checked in the following by taking a direct-read meter including 5 permanent magnet rotating wheels and 5 magnetic angle sensors as an example. That is, when N=5, a correction factor matrix thereof is as shown in FIG. 5. FIG. 6 shows rotation angles of permanent magnet rotating wheels of a system including 5 permanent magnet rotating wheels and 5 magnetic angle sensors. FIG. 7 shows raw output signals corresponding to a system including 5 permanent magnet rotating wheels and 5 magnetic angle sensors. FIG. 8 shows calculation values of raw rotation angles of a system including 5 permanent magnet rotating wheels and 5 magnetic angle sensors. FIG. 9 shows corrected output signals of a system including 5 permanent magnet rotating wheels and 5 magnetic angle sensors. FIG. 10 shows corrected rotation angles and errors of magnet rotating wheels of a system including 5 permanent magnet rotating wheels and 5 magnetic angle sensors. A relationship of corrected and non-corrected error values of rotation angles in FIG. 10 vs. rotation angles of 5 permanent magnet rotating wheels is as shown in FIG. 11. It can be seen that the non-corrected angle error ranges between 2 degrees and 5 degrees, while the corrected angle error is below 0.5 degrees. Therefore, the experimental result verifies validity of the calibration algorithm.

Embodiment III

Figure 12:
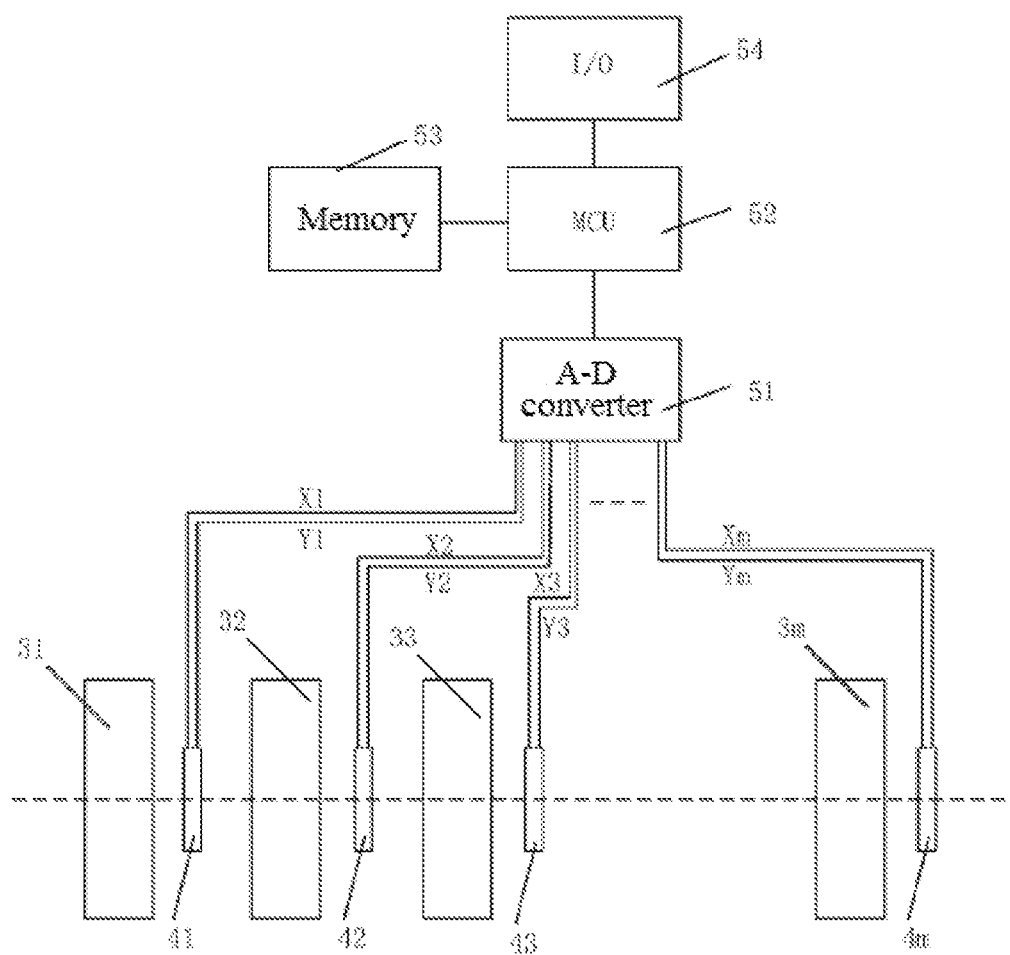
FIG. 12 is a diagram of signal processing of a direct-read meter system including multiple permanent magnet rotating wheels.

FIG. 12 shows a direct-read meter capable of eliminating magnetic interference of adjacent rotating wheels, which includes N permanent magnet rotating wheels 31, 32 to 3N and N corresponding biaxial angle sensors, i.e., 41, 42 to 4N (wherein the permanent magnet rotating wheels and the biaxial angle sensors are in a one-to-one corresponding relationship), and includes a sampling element 51 capable of high-speed sampling all the raw output sine/cosine signals of the N biaxial magnetic angle sensors to form a N*1 raw signal matrix $[V/V_p]_k(i)_{raw}$, a storage element 53 capable of storing an N*N correction matrix $[C_{ij}]$, and a computation element 52 that performs arithmetical operation $[V/V_p]_k\text{corr}(i)=[V/V_p]_k(i)_{raw}-\text{sum}\{C(i,j)*[V/V_p]_k(j)_{raw}\}$ to eliminate the interfering magnetic field. In this embodiment, the sampling element is an A/D converter, the computation element is a MCU microprocessor, and the storage element 53 is a memory that may be arranged outside the MCU or arranged inside the MCU. The computation element finally calculates the position of the rotation angle of the $i^{th}$ permanent magnet rotating wheel according to $[V/V_p]_k\text{corr}(i)$. In the direct-read meter, the interfering magnetic fields can be eliminated without soft magnetic shielding materials between the permanent magnet rotating wheels.

In the raw signal matrix $[V/V_p]_k(i)_{raw}$, k=x or y, $V_{xi}$, $V_{pxi}$ and $V_{yi}$, $V_{pyi}$ respectively correspond to two axial output signals of the $i^{th}$ biaxial magnetic angle sensor along the X axis and the Y axis and peak values thereof, and $[V/V_p]_k(i)_{raw}$ and $[V/V_p]_k\text{corr}(i)$ are respectively the N*1 raw signal matrix and the correction signal matrix of the biaxial magnetic angle sensor.

The output of the direct-read meter, after being processed by the computation element 52, is output from an I/O element 54.

The above descriptions are merely preferred embodiments of the present invention, but are not intended to limit the present invention. For those skilled in the art, the present invention may have various modifications and changes. The implementations in the present invention may also be combined and changed in other manners. Any modification, equivalent replacement, improvement and the like made within the spirit and principle of the present invention should all be included in the protection scope of the present invention.

The invention claimed is:

1. A direct-read meter capable of eliminating magnetic interference of adjacent rotating wheels, the direct-read meter comprising N permanent magnet rotary wheels and N corresponding biaxial magnetic angle sensors, the $i^{th}$ magnetic angle sensor sensing, along an X axis and a Y axis perpendicular to each other, a linear superposition of an intended magnetic field produced by the $i^{th}$ permanent magnet rotating wheel and interfering magnetic fields produced by the other N−1 permanent magnet rotating wheels, the permanent magnet rotating wheel producing the interfering magnetic field being the $j^{th}$ permanent magnet rotating wheel, and j≠i, wherein the direct-read meter comprises:

a sampling element, configured to high-speed sample all the raw output sine/cosine signals of the N biaxial magnetic angle sensors, respectively, to form a N*1 raw signal matrix $[V/V_p]k(i)_{raw}$, a storage element, configured to store an N*N correction matrix $[C_{ij}]$, and a computation element, configured to perform arithmetical operation $[V/V_p]_k\text{Corr}(i)=[V/V_p]_k(i)_{raw}-\text{sum}\{C(i,j)*[V/V_p]_k(j)_{raw}\}$ to eliminate the interfering magnetic field and obtain a rotation angle of the permanent magnet rotating wheel, wherein k=x or y, the element in the raw signal matrix $[V/V_p]_k(i)_{raw}$ is $V_{xi}/V_{pxi}$, or $V_{yi}/N_{pyi}$, $V_{xi}$ and $V_{yi}$ respectively correspond to two axial output raw signals of the $i^{th}$ biaxial magnetic angle sensor along the X axis and the Y axis, $V_{pxi}$ and $V_{pyi}$ respectively correspond to peak values of the two axial output raw signals of the $i^{th}$ biaxial magnetic angle sensor along the X axis and the Y axis, and $[V/V_p]_k(i)_{raw}$ and $[V/V_p]_k\text{corr}(i)$ are respectively the N*1 raw signal matrix and the correction signal matrix of the biaxial magnetic angle sensor.

2. The direct-read meter capable of eliminating magnetic interference of adjacent rotating wheels according to claim 1, wherein the raw signals $V_{xi}$, $V_{pxi}$ and $V_{yi}$, $V_{pyi}$ are respectively numerical values of two output sine/cosine signal curves of the biaxial magnetic angle sensor after offset processing.

3. The direct-read meter capable of eliminating magnetic interference of adjacent rotating wheels according to claim 1, wherein the correction matrix $[C_{ij}]$ is obtained by finite element calculation, or obtained by direct measurement data calculation.

4. The direct-read meter capable of eliminating magnetic interference of adjacent rotating wheels according to claim 1, wherein correction coefficients of the correction matrix $[C_{ij}]$ depend on geometrical parameters of the permanent magnet rotating wheels, relative positions of the permanent magnet rotating wheels and the biaxial magnetic angle sensors, and magnetization directions and magnetization intensities of the permanent magnet rotating wheels; wherein when the geometrical parameters and magnetization states of the permanent magnet rotating wheels are the same, the correction coefficients of the correction matrix $[C_{ij}]$ are the same.

5. The direct-read meter capable of eliminating magnetic interference of adjacent rotating wheels according to claim 1, wherein, in the direct-read meter, there is no soft magnetic shielding material between the permanent magnet rotating wheels.

6. The direct-read meter capable of eliminating magnetic interference of adjacent rotating wheels according to claim 1, wherein the permanent magnet rotating wheels are cylindrical, magnetization directions of the permanent magnet rotating wheels are parallel to directions of the permanent magnet rotating wheels passing through the diameter, or are along directions perpendicular to bottom surfaces of the permanent magnet rotating wheels, and there are anti-parallel magnetization directions in two half cylinders.

7. The direct-read meter capable of eliminating magnetic interference of adjacent rotating wheels according to claim 1, wherein the biaxial magnetic angle sensors are X-Y biaxial angle sensors.

8. The direct-read meter capable of eliminating magnetic interference of adjacent rotating wheels according to claim 1, wherein the biaxial magnetic angle sensors are AMR, GMR or TMR magnetic angle sensors.

9. The direct-read meter capable of eliminating magnetic interference of adjacent rotating wheels according to claim 1, wherein components output by non-linear voltage signals acting upon the biaxial magnetic angle sensors are reduced to improve precision of the measurement after correction.

10. The direct-read meter capable of eliminating magnetic interference of adjacent rotating wheels according to claim 9, wherein, when the biaxial magnetic angle sensors are GMR or TMR spin-valve sensors, magnetic field intensities of the permanent magnet rotating wheels are reduced, thus reducing rotation magnitude of pinning layers of the biaxial magnetic angle sensors to reduce non-linear components of curves of magnetic field measurement angles of the biaxial magnetic angle sensors versus magnetic field rotation angles, thus reducing non-linear components of the raw sine/cosine output voltage signals and improving the precision after correction.

11. The direct-read meter capable of eliminating magnetic interference of adjacent rotating wheels according to claim 9, wherein the magnetic design of the permanent magnet rotating wheels is to maintain constant magnitude of rotating magnetic fields at positions of the biaxial magnetic angle sensors, thus reducing the non-linear components of the raw sine/cosine output voltage signals and improving the precision after correction.

12. The direct-read meter capable of eliminating magnetic interference of adjacent rotating wheels according to claim 9, wherein the intended magnetic field is higher than the interfering magnetic fields to improve the precision after correction.

13. The direct-read meter capable of eliminating magnetic interference of adjacent rotating wheels according to claim 9, wherein the biaxial magnetic angle sensors are close to rotating shafts of the permanent magnet rotating wheels to improve the precision after correction.

14. A method for eliminating magnetic interference of adjacent rotating wheels in a direct-read water meter, wherein the direct-read water meter comprises N permanent magnet rotating wheels and N corresponding biaxial magnetic angle sensors, the method comprising:
  sensing a magnetic field using an $i^{th}$ magnetic angle sensor, wherein the magnetic field sensed using the $i^{th}$ magnetic angle sensor is a superposition of an intended magnetic field for an $i^{th}$ permanent magnet rotating wheel to be detected and interfering magnetic fields for other N−1 $j^{th}$ (j≠i) permanent magnet rotating wheels;
  using raw output sine/cosine signals of the N biaxial magnetic angle sensors to form a N*1 raw signal matrix $[V_i/V_{pi}]_{raw}$, and $V_{xi}$, $V_{pxi}$ and $V_{yi}$, $V_{pyi}$ respectively corresponding to two axial raw output signals of the biaxial magnetic angle sensor along an X axis and a Y axis and peak values thereof;
  forming an N*1 signal correction matrix $[V_i/V_{pi}]_{correct}$ by multiplying the N*1 raw signal matrix $[V_i/V_{pi}]_{raw}$ by an N*N correction matrix $[C_{ij}]$; and
  calculating rotation angles of the permanent magnet rotating wheels using the N*1 signal correction matrix $[V_{ix}/V_{pi}]_{correct}$ and the N*N correction matrix $[V_{iy}/V_{ypi}]_{correct}$.

15. The method according to claim 14, further comprising performing a finite element calculation to obtain the correction matrix $[C_{ij}]$.

16. The method according to claim 14, further comprising performing a direct measurement data calculation to obtain the correction matrix $[C_{ij}]$.

17. A direct-read meter comprising N permanent magnet rotary wheels and N corresponding biaxial magnetic angle sensors, wherein each of the biaxial magnetic angle sensors is capable of sensing, along an X axis and a Y axis perpendicular to each other, a linear superposition of an intended magnetic field produced by a corresponding permanent magnet rotating wheel and interfering magnetic fields produced by other permanent magnet rotating wheels corresponding to other ones of the biaxial magnetic angle sensors, wherein the direct-read meter comprises:
  a sampling element configured to sample raw signals from the N biaxial magnetic angle sensors and form an N*1 raw signal matrix (i) $[V/V_p]_k(i)_{raw}$ from the sampled raw signals;
  a storage element configured to store an N*N correction matrix $[C_{ij}]$; and
  a computation element configured to determine a rotation angle of the permanent magnet rotating wheel using the N*1 raw signal matrix and the N*N correction matrix.

18. The direct-read meter according to claim 17, wherein the direct-read meter does not include soft magnetic shielding material between the permanent magnet rotating wheels.

19. The direct-read meter according to claim 17, wherein the direct read meter is configured to maintain constant magnitude of rotating magnetic fields at positions of the biaxial magnetic angle sensors.

20. The direct-read meter according to claim 17, wherein the biaxial magnetic angle sensors are close to rotating shafts of the permanent magnet rotating wheels.

* * * * *

UNITED STATES PATENT AND TRADEMARK OFFICE
CERTIFICATE OF CORRECTION

PATENT NO. : 10,794,752 B2
APPLICATION NO. : 15/543356
DATED : October 6, 2020
INVENTOR(S) : Deak et al.

Page 1 of 1

It is certified that error appears in the above-identified patent and that said Letters Patent is hereby corrected as shown below:

On the Title Page

In item (30), in "Foreign Application Priority Data", in Column 1, Line 1, before "Jan.", insert --Jan. 21, 2015 (CN) 2015 1 0029996 U--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*